United States Patent
Charon et al.

(10) Patent No.: US 6,782,702 B2
(45) Date of Patent: Aug. 31, 2004

(54) COMPRESSOR AIR DRAWING OFF SYSTEM

(75) Inventors: Christophe Charon, Vaux le Penil (FR); Graëme Cook, Hericy (FR); Grégory Garcia, Montgeron (FR); Patrick Kapala, Villevaude (FR); Eric Lippinois, Melun (FR); Claude Loudet, Maincy (FR); Fabrice Marois, Melun (FR); Lucien Pham, Le Mee (FR); Dominique Raulin, Avon (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/227,337

(22) Filed: Aug. 26, 2002

(65) Prior Publication Data
US 2003/0051482 A1 Mar. 20, 2003

(30) Foreign Application Priority Data
Aug. 30, 2001 (FR) .............................. 01 11233

(51) Int. Cl.⁷ ................................................ F02C 6/08
(52) U.S. Cl. ........................................................ 60/785
(58) Field of Search .............................. 60/785; 415/144

(56) References Cited

U.S. PATENT DOCUMENTS

| | | | |
|---|---|---|---|
| 1,730,748 A | | 10/1929 | Schmidt |
| 4,329,114 A | * | 5/1982 | Johnston et al. ............ 415/145 |
| 5,160,241 A | | 11/1992 | Glynn |
| 5,351,478 A | | 10/1994 | Walker et al. |

FOREIGN PATENT DOCUMENTS

| | | |
|---|---|---|
| FR | 2186602 | 1/1974 |
| FR | 2 616 890 | 12/1988 |

* cited by examiner

Primary Examiner—Ehud Gartenberg
(74) Attorney, Agent, or Firm—Oblon, Spivak, McClelland, Maier & Neustadt, P.C.

(57) ABSTRACT

A low of compressed air originating from a compressor stream (3) is drawn off through first orifices (13) towards ducts (5, 6) leading outside the casing, creating a flow division through adjacent cavities (11, 12) in the casing (1). These arrangements make it possible to carry a large air flow even if the cavity cross sections (11, 12) are small.

15 Claims, 2 Drawing Sheets

COMPRESSOR AIR DRAWING OFF SYSTEM

The invention is related to a system for drawing off air from a compressor.

Aircraft engines comprise gas turbines in which the air used in the composition of the fuel mix is compressed. A portion of the compressed air is drawn off from the compressor for various purposes, including pressurization of the cabin, de-icing and ventilation of the engine turbine to cool it.

Compressed air is drawn off through the stator casing, which in particular is composed of an outer skin that makes the assembly rigid and an inner lining that delimits the air flow stream and is essentially composed of annular segments assembled to each other, some of which carry the fixed compressor blades and the others that alternate with the first are arranged in front of the mobile blades of the rotor. Orifices are drilled in this lining so that part of the air flowing into the stream enters the lining; if the flow to be drawn off is large, these orifices may be replaced by a complete circular slit. The orifices communicate with a cavity formed between the outer skin and the inner lining of the casing, and therefore it is possible that it is sufficient to drill orifices through the outer skin to access this cavity and drawing off air that flowed in it and allowing it to take a path leading to where it is wanted.

However, problems sometimes arise when a large air flow is to be drawn off. Since the air flow speed is limited, the flow can be increased only by increasing the size of the cross-section available for the drawing off flow, at all positions along this flow. This requirement can be satisfied partly by increasing the size of the orifices passing through the inner lining and the outer skin of the casing, and the evaluation duct; but it is impossible to increase the size of the intermediate cavities between the outer skin and the inner lining, that the drawn off air passes through in the tangential direction of the engine to collect under the outer orifice, since the section of the annular cavities is determined by the shapes of the outer skin and the inner lining imposed for other reasons.

Therefore, the section of the drawing off cavity is frequently too small to enable the requested air flow. It is also possible that the cavity is not suitable for convenient routing of drawn off air, if it is partitioned or for another reason. A conventional solution to this difficulty is that up to now, a circular tube called the manifold was placed around the cavity, the role of which was to replace this cavity by providing a sufficient cross section for annular air flow collecting towards the final drawing off duct. Air then passed approximately radially through the cavity, leaving through a group of a sufficient number of orifices leading to the inside of the manifold. However, the manifold is relatively expensive to make and to install, and the casing surround was sometimes too large to contain it. An equivalent design described in patent FR 2 616 890 A consisted of replacing the manifold by a large number of separate ducts, each connected to one of the orifices passing through the outer skin of the casing. Another design represented by U.S. Pat. No. 5,351,478 is compromise between the previous design and a design with a single drawing off duct; it is recommended that four drawing off ducts should be arranged crosswise around the outer skin in order to reduce the air movement in the tangential direction in the cavity.

Therefore, prior art shows that the tangential movement in the cavity can be reduced at will by increasing the number of taking off orifices, such that the hindrance to flow caused by the cross sectional area or the conformation of the cavity disappears. However, the ramification of the flow may be considered to be a problem if it is excessive due to design constraints imposed by a manifold surrounding the orifices or a large number of separate drawing off ducts.

The purpose of the invention is then to enable drawing off of compressed air through a casing comprising an outer skin and an inner lining and that only tolerates a limited air flow within its body in the tangential direction, but in which excessive ramification of the flow is avoided and the drawing off device around the casing is simple and compact. The ramification in the tangential direction is replaced by a combined tangential and longitudinal ramification that advantageously simplifies the system.

The invention thus relates to a system for drawing off air from a compressor in an aircraft engine through a lining of a casing that delimits an air flow stream, comprising orifices passing through an outer skin of the casing that delimits several cavities with the lining, the take off air passing through the orifices after passing through the lining, and also comprising drawing off ducts connected to the outer skin around the orifices, characterized in that two of the cavities carry drawn off air, the drawing off ducts extend through openings around pairs of orifices, the orifices in each of the pairs leading to the said corresponding two cavities through which the drawn off air passes. Typically, there are two diametrically opposite ducts on the casing. Finally, it is advantageous that the lining should comprise a single slit in front of the upstands delimiting the two cavities through which the air flow passes and through which air inlet orifices are drilled in the said cavities; air drawn off from a particular location in the compressor is in the same homogeneous state in the two cavities and is combined in the ducts without turbulence.

These aspects of the invention and others will now be described in more detail with reference to the following figures.

Figure 1:
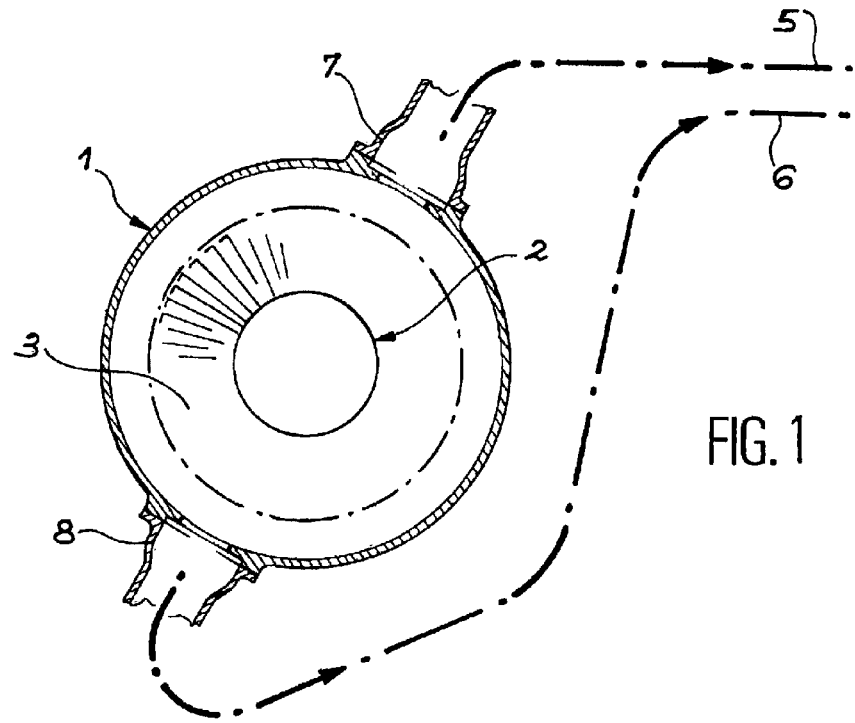
FIG. 1 is a general view showing the layout of the invention.

FIG. 1 shows a compressor casing 1 separated from a concentric rotor 2 by a compressed air flow stream 3. Compressed air is drawn off from the compressor through two ducts 5 and 6 that are used in common, for example for pressurization of the aircraft cabin, and are connected to the casing 1 through two diametrically opposite openings 7 and 8. The ducts 5 and 6 are not joined together at all, or if they are joined together the junction is at a distance from the casing 1.

Figure 2:
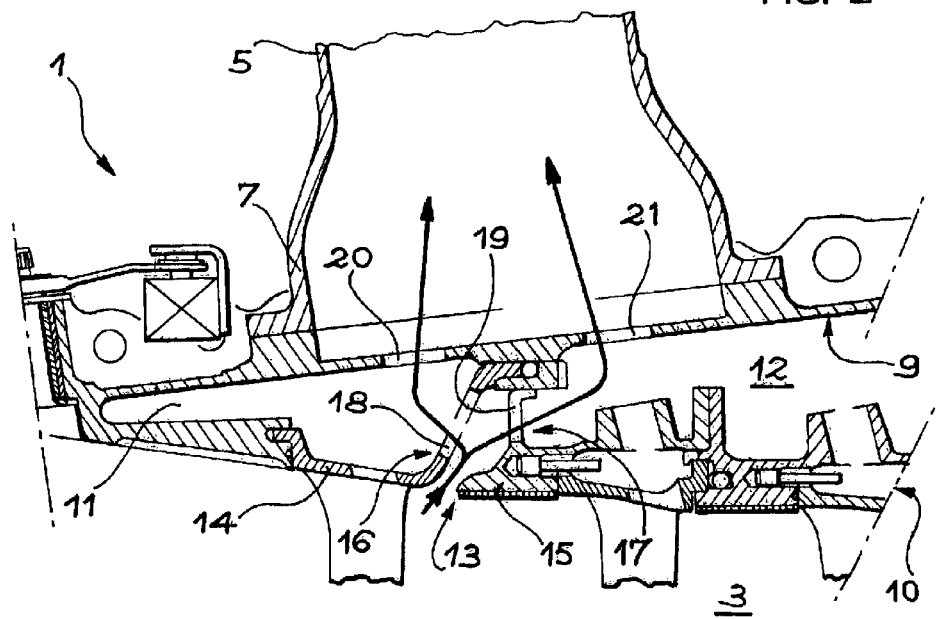
FIG. 2 shows the detail of the drawing off method.

The remainder of the description is equally applicable to the region of the opening 8 and to the region of the opening 7, but only the opening 7 will be described. With reference to FIG. 2, it can be seen that the casing 1 is composed of an outer skin 9 and a lining 10 separated by cavities, two of which are shown on the drawings and are marked with references 11 and 12. The opening 7 is fixed to the outer skin 9, while the lining 10 delimits the air stream 3. The lining 10 comprises orifices, in this case a single circular slit 13 to draw off compressed air passing along the stream. The slit 13 is formed between a straightening ring 14 and a shell ring 15 which form part of the lining 10 and are connected to the outer skin 9 through approximately radial upstands marked with references 16 and 17 respectively and that extend behind the slit 13, the cavity 11 extends behind the upstand 16 and the cavity 12 behind the upstand 17.

Orifices 18 and 19 are drilled in upstand 16 and 17 to enable the compressed air trapped in slit 13 common to cavities 11 and 12 to enter into it. Air passes through cavities 11 and 12 and half of it leaves through orifices 20 and 21 passing through the outer skin 9 to reach the opening 7, the other half leading to opening 8.

According to the design described in document U.S. Pat. No. 5,351,478 A, four drawing off ducts would have communicated with the cavity 11, for example, through the corresponding number of orifices with a sufficiently large cross section uniformly distributed at right angles. In this case the orifices were grouped differently, in two rows each comprising an orifice 20 and an orifice 21 oriented in the longitudinal direction of the compressor, each of the rows being surrounded by one of the openings 7 and 8. The area of the orifices 20 and 21 may be the same as the area that would have been provided with a manifold. Oblong orifices 20 and 21 can be provided extending in the tangential direction of the compressor, so that the openings 7 and 8 with a rectangular (almost square) transition cross-section can be used, that connect to ducts 5 and 6 with a smaller cross-section, by gradually modifying the section so that they are in the general shape of a bell.

The use of several drawing off ducts 5 and 6 reduces the air flow passing tangentially through cavities 11 and 12 to reach openings 7 and 8, and sharing the drawn off flow between the two cavities 11 and 12 further reduces this tangential flow. Thus, the drawn off flow is no longer limited by the size of the sectional cavities 11 and 12 being too small. Another major advantage of this invention is that orifices 20 and 21 are grouped in adjacent pairs under openings that are large enough so that half of the drawing off ducts in previous designs can be eliminated.

Figure 3:
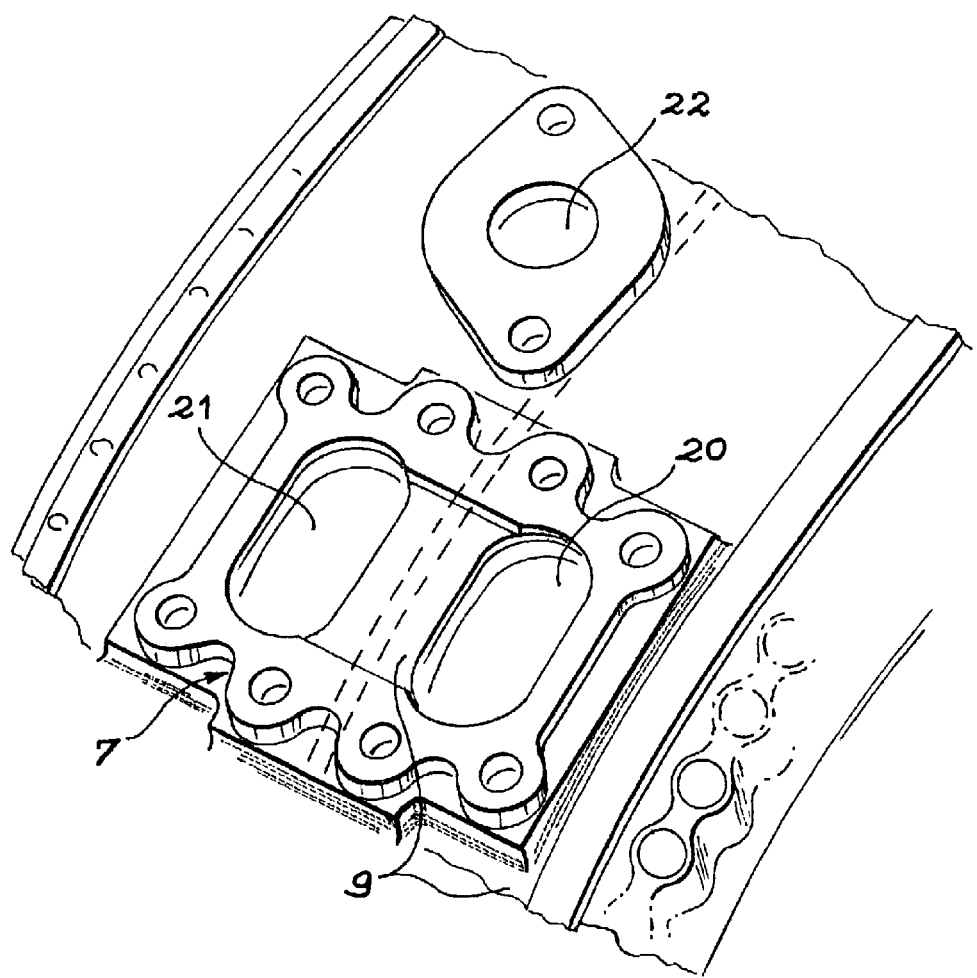
FIG. 3 illustrates the layout of orifices in the taking off ducts.

FIG. 3 also shows other orifices 22 passing through the outer skin 9 and located on the line of the orifices 21, in other words leading to the same cavity 12. These are drawing off orifices for other uses of a proportion of the compressed air drawn off through the slit 13 and that ended up in cavity 12. Thus, the joint contribution of cavities 11 and 12 for the air supply to be used for other specific purposes (in this case the cabin) does not exclude the use of these cavities to supply an additional air flow to be used for other purposes.

What is claimed is:

1. System for drawing off air from a compressor in an aircraft engine through a lining of a casing that delimits an air flow stream, comprising orifices passing through an outer skin of the casing that delimits several cavities with the lining, take off air passing through the orifices after passing through the lining, and also comprising drawing off ducts connected to the outer skin around the orifices, wherein a first cavity and a second cavity carry drawn off air, at least one of the drawing off ducts extending through an opening around a first orifice and a second orifice, said first orifice leading to said first cavity and said second orifice leading to said second cavity, and wherein the lining includes a single slit located in front of a first upstand and a second upstand delimiting the first and second cavities respectively, said first upstand defining a first air inlet for said first cavity and said second upstand defining a second air inlet for said second cavity.

2. System for drawing off air according to claim 1, wherein the first and second orifices are oblong, elongated in a tangential direction of the compressor and arranged in rows in a longitudinal direction of the compressor.

3. System for drawing off air according to claim 2, wherein the opening widens into the form of a bell with an almost square cross section towards the outer skin.

4. System for drawing off air according to claim 1, wherein two of said ducts are diametrically opposite on the casing.

5. A system for drawing off air from a compressor, said system comprising:

a casing including an outer skin and a lining, said casing defining a first cavity and a second cavity between said outer skin and said lining, said first cavity having a first cavity inlet and a first cavity outlet, said second cavity having a second cavity inlet and a second cavity outlet; and a duct coupled to said casing and in communication with said first cavity via said first cavity outlet and in communication with said second cavity via said second cavity outlet, wherein said lining comprises a lining opening in communication with said compressor so that an airflow from said compressor passing through said lining opening includes a first airflow portion which passes through said first cavity inlet and said first cavity outlet and further includes a second airflow portion which passes through said second cavity inlet and said second cavity outlet, said first cavity being free of said second airflow portion and said second cavity being free of said first airflow portion.

6. The system of claim 5, comprising two ducts coupled to said casing.

7. The system of claim 5, wherein said first and second cavity outlets are oblong.

8. The system of claim 7, wherein said first and second cavity outlets are elongated in a tangential direction of the compressor.

9. The system of claim 8, wherein said first and second cavity outlets are arranged in rows in a longitudinal direction of the compressor.

10. A system for drawing off air from a compressor, said system comprising:

a casing including an outer skin and a lining, said casing defining a first cavity and a second cavity between said outer skin and said lining; and a duct coupled to said casing and in communication with said first cavity and with said second cavity, wherein said lining comprises means for dividing an airflow from said compressor into a first airflow portion and a second airflow portion, said first airflow portion passing through said first cavity to said duct without passing through said second cavity and said second airflow portion passing through said second cavity to said duct without passing through said first cavity.

11. The system of claim 10, comprising two ducts coupled to said casing.

12. The system of claim 10, wherein said first cavity has a first cavity outlet communicating with said duct and said second cavity has a second cavity outlet communicating with said duct.

13. The system of claim 12, wherein said first and second cavity outlets are oblong.

14. The system of claim 13, wherein said first and second cavity outlets are elongated in a tangential direction of the compressor.

15. The system of claim 14, wherein said first and second cavity outlets are arranged in rows in a longitudinal direction of the compressor.

* * * * *